(12) United States Patent
Vollmer et al.

(10) Patent No.: US 7,979,351 B1
(45) Date of Patent: Jul. 12, 2011

(54) PREPAID TRANSACTION CARD ACTIVATION SYSTEM AND METHOD

(75) Inventors: Nicole Milne Vollmer, Murray, UT (US); Lance Lewis, Farmington, UT (US); Elizabeth Gwen Webb, South Jordan, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 965 days.

(21) Appl. No.: 10/966,995

(22) Filed: Oct. 15, 2004

Related U.S. Application Data

(60) Provisional application No. 60/574,461, filed on May 25, 2004.

(51) Int. Cl.
*G06Q 40/00* (2006.01)

(52) U.S. Cl. .................. 705/41; 705/1; 705/40; 705/44; 705/39

(58) Field of Classification Search .................. 705/41, 705/1, 18, 39, 67, 44, 38, 65; 235/380, 383, 235/381, 379; 379/114
See application file for complete search history.

(56) References Cited

U.S. PATENT DOCUMENTS

| | | | |
|---|---|---|---|
| 4,650,978 A | 3/1987 | Hudson et al. | |
| 4,701,601 A | 10/1987 | Francini et al. | |
| 4,837,422 A | 6/1989 | Dethloff et al. | |
| 5,577,109 A | 11/1996 | Stimson et al. | |
| 5,714,741 A | 2/1998 | Pieterse et al. | |
| 5,721,768 A | 2/1998 | Stimson et al. | |
| 5,721,781 A | 2/1998 | Deo et al. | |
| 5,757,918 A | 5/1998 | Hopkins | |
| 5,777,305 A | 7/1998 | Smith et al. | |
| 5,825,863 A | 10/1998 | Walker | |
| 5,884,271 A | 3/1999 | Pitroda | |
| 5,903,633 A | 5/1999 | Lorsch | |
| 5,943,423 A * | 8/1999 | Muftic ............................ 705/67 |
| 5,991,413 A | 11/1999 | Arditti et al. | |
| 6,226,744 B1 | 5/2001 | Murphy et al. | |
| 6,227,447 B1 | 5/2001 | Campisano | |
| 6,257,486 B1 | 7/2001 | Teicher et al. | |
| 6,298,336 B1 | 10/2001 | Davis et al. | |
| 6,341,724 B2 | 1/2002 | Campisano | |
| 6,375,073 B1 | 4/2002 | Aebi et al. | |
| 6,473,500 B1 * | 10/2002 | Risafi et al. .............. 379/144.01 |
| 6,488,206 B1 | 12/2002 | Flaig et al. | |
| 6,612,487 B2 | 9/2003 | Tidball et al. | |
| 7,069,251 B1 * | 6/2006 | Bartz et al. ....................... 705/75 |
| 7,093,761 B2 * | 8/2006 | Smith et al. .............. 235/462.07 |
| 2001/0034707 A1 | 10/2001 | Sakaguchi | |
| 2003/0014360 A1 | 1/2003 | Arditti et al. | |
| 2003/0043984 A1 | 3/2003 | Lauzon | |
| 2003/0126092 A1 | 7/2003 | Chihara | |
| 2003/0187790 A1 * | 10/2003 | Swift et al. ...................... 705/40 |

OTHER PUBLICATIONS

Eckoh Technologies: Eckoh and Auctionworld launch UK's first 24 hour TV phone shopping channel. Feb. 12, 2003, Financial Times Information Limited.*

* cited by examiner

*Primary Examiner* — Mary Cheung
*Assistant Examiner* — John H Holly
(74) *Attorney, Agent, or Firm* — Snell & Wilmer L.L.P.

(57) ABSTRACT

The present subject matter relates to reloadable or non-reloadable prepaid transaction card activation systems. More specifically, the system provides a platform for activation of prepaid or stored value transaction cards and capture of customer demographic information, and verification of that information, after the customer has obtained or has been issued a prepaid transaction card. The data capture is performed at activation rather than at point of sale.

14 Claims, 5 Drawing Sheets

PREPAID TRANSACTION CARD ACTIVATION SYSTEM AND METHOD

CROSS REFERENCE TO RELATED APPLICATIONS

This application claims priority from provisional patent application Ser. No. 60/574,461 filed 25 May 2004, entitled "TRANSACTION CARD ACTIVATION SYSTEM" the entire disclosure of which is incorporated herein by reference.

TECHNICAL FIELD

The present subject matter relates to prepaid transaction card activation systems. More specifically, the system provides a platform for activation of prepaid or stored value transaction cards and capture of customer demographic information, and verification of that information, after the customer has obtained or has been issued a prepaid transaction card.

BACKGROUND

Prepaid transaction cards or prepaid stored value cards, i.e. transaction cards that require funds to be deposited into an account for use of the card and which can then be used for purchases or ATM withdrawals up to the prepaid amounts, are becoming more and more popular. Certain prepaid cards are reloadable, i.e., the customer can add funds to the associated account. An example of a reloadable card is the Travelers Cheque Card from American Express®. Other cards cannot be reloaded. Examples of such non-reloadable cards are the American Express® Gift Card and the Be My Guest® Dining Card from American Express®. Due to increased fraud, risk and security concerns, issuers of prepaid transaction cards obtain certain demographic data about the card customer before activating the card.

The current process for issuing such cards generally includes an application process and an activation call. In the application process, issuers obtain the desired demographic data by requiring a customer to complete an application similar to a credit card application. The application can be completed as a paper application or on-line, and must be sent to the card issuer for review and approval.

If approved, a card is then issued to the purchaser, or to another recipient for whom the purchaser acquired the card. When the recipient receives the card, the recipient must activate the card. Typically, this is done by having the recipient call a toll-free activation number that is provided by the issuer which prompts the recipient to enter information to confirm that the actual recipient is the intended recipient. The traditional application and approval process is time consuming and it usually takes several days, i.e. 7-10 days, for a recipient to receive an activated card.

Thus, there is a need for a more efficient verification system to activate prepaid transaction cards and capture customer demographic information, which substantially eliminates fraud and security issues.

SUMMARY

The present invention relates to a new prepaid transaction card activation system. Under the inventive card activation process, a person may purchase a prepaid transaction card at a merchant location without completing a written or on-line application. The prepaid card has an initial amount of money associated with or credited to that card's account number. As an example, the customer can purchase a $100 card that will have $100 associated with the account. In order to activate the card, the customer initiates an activation call and, through an interactive voice response system (IVR) provides items of information, which can be entered numerically. The items of information include, but are not limited to the customer's social security number; date of birth; postal zip code; and home phone number. Based on the information provided by the customer, and while the customer is still on the activation call, a card issuer through its own local computer system(s) and internal database(s), can verify the information and obtain other non-numeric, demographic information about the customer, e.g., the customer's name and address, from a external/remote computer database(s). The card issuer's internal database(s) can be associated with one or more systems linked to the IVR system.

Based on all the information, including the items of information provided by the customer and the related information obtained by the system based on the captured customer information, the system can either approve activation of the card or decline it during the telephone call. If activation is approved, the customer can begin using the card immediately. If activation is declined, the customer can either talk to a customer service representative to provide additional information in an effort to activate the card and/or arrange for a return and refund of the amount of the card purchase. This process eliminates the need for a traditional application to be completed and sent to the card issuer, allowing cards to be sold by merchants, and typically takes several minutes, rather than several days to complete.

The inventive system and protocol captures and validates the application demographics, approves, and activates the card in a phone call which can be less than 3 minutes. The system captures data, performs an assessment, and makes a decision (qualifies the card holder for eligibility). The data capture can be performed at activation rather than at point of sale. The system captures a minimum amount of data from the card recipient and then enriches the data through other data points, qualifying the card holder for eligibility and then storing the data in a customer demographics database. The customer demographics database can be accessed by the issuer for future purchases of prepaid transaction cards by the customer. This customer demographic data can also be accessed to verify the purchase of a card in order to facilitate a refund to the customer when the card is lost or stolen.

Manually gathering the application demographics can be partially or completely eliminated. The system is robust and will still allow manual gathering of application demographics if the IVR is down or the customer opts out. This system allows issuers to sell prepaid transaction cards through third parties which cannot capture the desired demographic information.

An objective is to use an IVR system to capture customer information, validate that it is accurate, make a quality decision, and activate a prepaid transaction card.

It is another objective to obtain customer demographic information (new card application information) during the card activation process via the IVR to close the gaps on information an issuer has about the customer.

It is still another objective to meet various legal, compliance and risk management requirements associated with prepaid transaction cards.

It is yet another objective to enable customer service to perform similar activation functionalities as the IVR, and provide risk management processing capabilities such as deferred or declined activation handling and over-spend notification addresses.

Another objective is to perform real time validation of prepaid transaction cards.

It is still another objective to provide a transaction card that allows the customer to purchase and walk away with a card, which can be activated separately.

It is another objective to provide a system that is automated, but may provide a customer service representative's assistance if the consumer opts out of the automatic system. The new system can be designed so that the customer service representative can determine where the consumer dropped out of the automated IVR and can assist the consumer with activation from that point without taking the consumer through the entire process again.

It is yet another objective to provide for a computer readable medium bearing instructions for activating a prepaid transaction card. When the instructions are executed they are arranged to cause one or more processors to perform the general process steps of verifying, capturing, validating and activating.

Additional objects, advantages and novel features of the present invention will be set forth in part in the description which follows, and in part will become apparent to those skilled in the art upon examination of the following and the accompanying drawings or may be learned by production or operation of the examples. The objects and advantages of the concepts may be realized and attained by means of the methodologies, instrumentalities and combinations particularly pointed out in the appended claims.

Moreover, additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
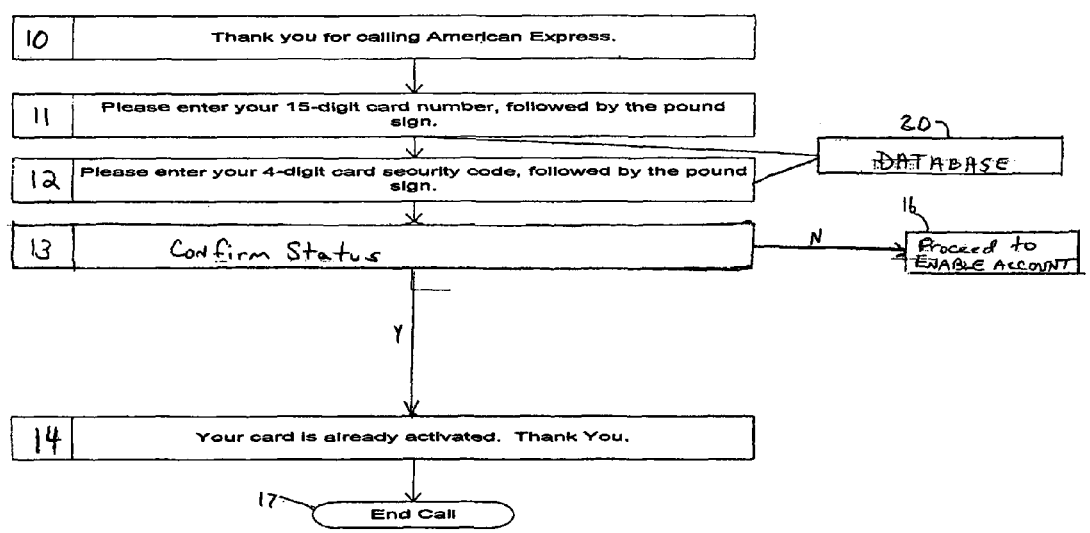
FIG. 1 illustrates a flow chart of a portion of a prepaid card activation and data capture process implemented by an interactive voice response system to activate a prepaid transaction card.

Referring now to FIG. 1, a flow chart of a portion of a process for an interactive voice response, prepaid transaction card activation and data capture system according to an embodiment of the present invention is shown. To initiate the process a caller/customer must call a phone number, usually a dedicated, toll-free phone number provided by the card issuer. The process is run on an interactive voice response system configured to provide the caller with the choices and responses as described herein and on the accompanying Figures.

Once connected, the caller is welcomed with a greeting 10. The caller is informed that certain information may need to be collected from both the purchaser and recipient of the card. There are scenarios where information will need to be collected from just the card holder and not the purchaser and recipient. The caller will be advised that before the card can be activated and used, the caller may be required to provide several pieces of information including his/her social security number, date of birth, home phone number and postal zip code. To begin activation, the caller will confirm that they wish to activate the card and proceed accordingly. If the caller does not wish to provide the information or otherwise desires to cancel the call and request a reimbursement, the caller has the option to press the appropriate telephone key and/or speak with a customer service representative. If the caller prefers to speak with a customer service representative, the call can be transferred to a customer service center for manual processing by a customer service representative.

The process shown herein can be used for a purchaser of a prepaid transaction card that has received the card as a result of an application process or by buying the card "anonymously", i.e., at a point of purchase. If the card was issued as a result of the application process, the system may have the desired demographic data in a database and, when the customer enters the card number and security code printed on the card, the system will indicate that the card is activated. The card is activated at this point because the card issuer has gathered all the desired information from the application, prior to issuing the card and the data is successfully compared to that entered by the caller. The caller is informed that the card is activated and the call is terminated at this point.

Figure 2:
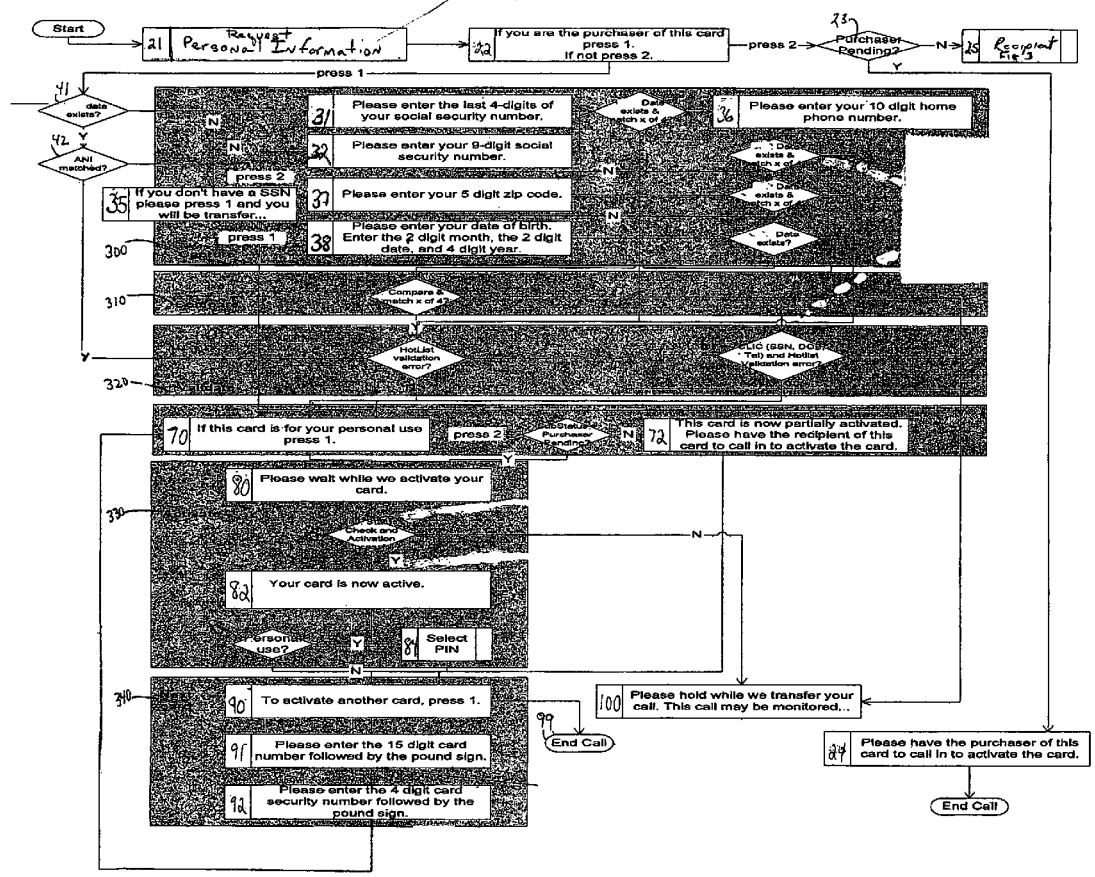
FIG. 2 illustrates a flow chart of a portion of a prepaid card activation and data capture process implemented by a purchaser of a transaction card on an interactive voice response system.
Figure 3:
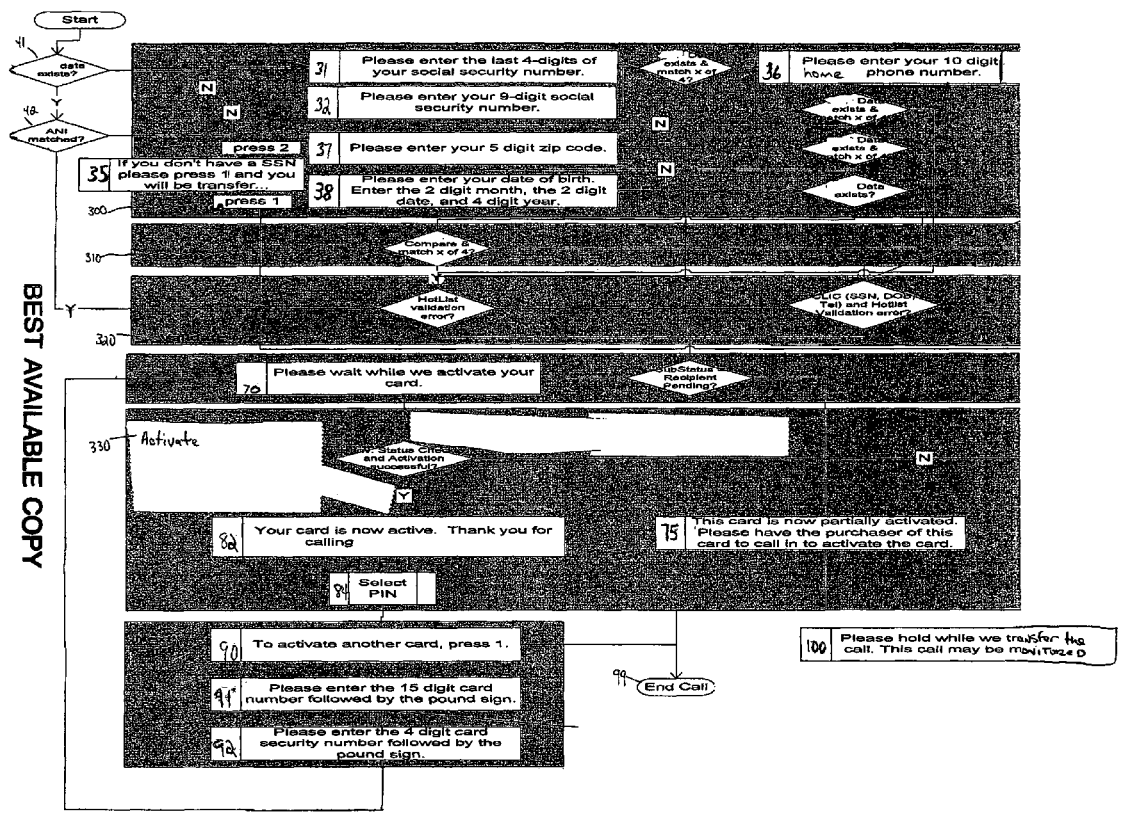
FIG. 3 illustrates a flow chart of a portion of a prepaid card activation and data capture process implemented by a recipient of a transaction card who is not the purchaser of the card, on an interactive voice response system.

However, if the card was purchased at a retail merchant and the card issuer has no information about the customer, i.e. the card was purchased "anonymously", the customer will be prompted to provide information, as described below. If the person calling is the purchaser of the card, they will be directed to follow steps as shown in FIG. 2 (discussed below). If the person calling is not the purchaser of the card, i.e. the recipient of the card, then they will be directed to follow steps as shown in FIG. 3 (discussed below). It should be understood that each process described above could be imposed on the purchaser or the recipient of the card. Moreover, in certain instances, both the purchaser and recipient of the card will not necessarily be required to activate the card, but rather, only the cardholder will be required to provide the activation information.

During card number verification 11, the caller is prompted to enter the multi-digit card number. If no option is pressed within several seconds, the system will notify the caller that no input has been received and request that the card number be entered. If an invalid number of digits is entered for the card number, the system will notify the caller the they have not entered enough digits or too many digits and request the caller to renter the card number. Further, if the internal database 20 cannot validate the card number then the system will indicate to the caller that the card number entered cannot be located and request that the card number be reentered. If another input error occurs, the caller will be placed on hold and the call will be transferred to a customer service representative. The number of times an input error occurs before the call is transferred to a customer service representative is programmable.

Once the card number is entered correctly, the system will prompt the caller to enter the card security code 12. The caller will be informed that the security code, such as a four digit number, is located on the front or back of the card, preferably near the card number. If no option is pressed within several seconds, the system will notify the caller that no input has been received and request that the security code be entered. When an invalid number of digits is entered for the security code, the system will notify the caller that they have not entered enough digits or too many digits and request the caller to renter the security code. If the internal database 20 cannot validate the security code then the system will indicate to the caller that the security code number entered cannot be located and request that the security code be reentered. If another input error occurs, the caller will be placed on hold and the call will be transferred to a customer service representative. If the card security code is entered correctly and the internal database 20 validates it, then the system will check to see if the card status is already active 13. If the card is already active, the system will advise the caller that the card was previously activated 14 and the call will be terminated 17, but if the card is not activated, the process will proceed with enabling the account 16, as described in further detail in FIGS. 2, 3 and 4. The number of times a caller will be prompted for a card number or card security code is configurable and not limited to two attempts as described above.

As shown in FIG. 2, during the capture process a person may be requested to provide social security number, phone number, postal zip code and date of birth. All or only a portion of this information may be requested. While the information is gathered in a certain order in the flow chart shown, the information may be gathered in a different order as well. As the information is entered by a customer, it can be compared to an inventory database which is referred to in the diagrams and which has information about the card linked to the account number on the card. Information can include how the card was issued, e.g., through the application process or "anonymously", and what type of card it is, e.g., reloadable on non-reloadable. If the card was issued as a result of an application process, card purchaser and/or user information may also be available. If the card was purchased anonymously, there will be no purchaser or card user information available and that information must be captured prior to activation.

During the capture process, as information is entered, a compare process is activated to determine the number of matches of information provided with corresponding information in the internal database 20, if it is available. Based on these comparisons, once a certain number of matches are obtained, the overall process moves to the validation process. In the validation process the card information is checked with a "hot list" of flagged information that would cause the issuer not to authorize the card, e.g., the person may be someone who should not be issued a card because of credit problems, fraud or security concerns, etc.

If no database information is available about the purchaser or card user, then the compare process is skipped, and all of four pieces of desired information are gathered. After all four pieces of information are gathered, the overall process moves to a validation process. In this validation process customer demographic information is obtained from internal and/or external databases based on the four pieces of information input by the customer. For example, a person's name, address and other similar information can be obtained and stored in the issuer database. This process is also referred to as a "reverse append" process. Then, based on all the information, the user input information and the other demographic information obtained from databases, a decision can be made whether or not to validate the card, and the "hot list" can also be checked.

After the validation process, if the caller is also the person that will be using the card, the caller is then taken through the activation process, followed by the next card activation process if they have additional cards to activate.

FIG. 2 details the activation of a pre-paid transaction card that is reloadable. In FIG. 2, the caller will be prompted 21 to enter their personal information. The system will then confirm 22 whether the caller is the purchaser of the card, or if the card was purchased for them by someone else. If the caller is the purchaser of the card and has not yet activated the card and the recipient has previously called and activated the card, the system will proceed to gather the purchaser's information in the capture process 300. Further, if the purchaser has activated the card and the recipient has not, the recipient of the card must call the activation line and provide their personal information 25 to proceed with activation, as described in further detail in FIG. 3. When the caller is the recipient of the card 23, and has previously activated the card, but the purchaser of the card has not yet activated the card, the system will advise that the purchaser must call the activation line 24 and provide their personal information in order to proceed with activation. When both the purchaser and the recipient have activated the card, the system will proceed to the activation step 330. If neither the purchaser nor the recipient have activated the card, the system will proceed to gather the caller's information in the capture process 300.

If the home phone has been captured through an automated sales system and already exists 41 in the internal database 20, the system will check 42 automatic number identification (ANI). If ANI matches what is in the internal database 20, the process will proceed to a hot list validation 60, then to personal use confirmation 70 and ultimately activation, as there is no need to capture additional information. In the event that no information exists in the system, the process will proceed with the capturing of information described below.

During social security number validation, the caller will be required to enter the last four digits of their social security number 31. If data does not exist in the internal database 20, the caller will be required to enter their full 9 digit social security number 32. When the caller does not have a valid social security number 35, the caller will indicate such and the call will be transferred to a customer service representative. If no option is pressed within several seconds, the system will notify the caller that no input has been received and request that the social security number be entered. When an invalid number of digits is entered for the social security number, the system will notify the caller that they have not entered enough digits or too many digits and request the caller to renter the security code. If an input error occurs, then the system will indicate to the caller that the social security number entered cannot be located and request that the card number be reentered. If another input error occurs, the caller will be placed on hold and the call will be transferred to a customer service representative.

The caller's home phone number will be captured following the completion of the social security number validation discussed above. The caller is prompted 36 to enter their home phone number including area code. If no input is received within several seconds, the system will notify the caller that no input has been received and request that the home phone number be entered. When an invalid number of digits is entered for the home telephone number, the system will notify the caller that they have not entered enough digits (less than 10) or too many digits (more than 10) and request the caller to reenter the home phone number. If an input error occurs, then the system will indicate to the caller that the home phone number entered cannot be located and request that the home phone number be reentered. If another input error occurs, the caller will be placed on hold and the call will be transferred to a customer service representative.

Throughout data capture, the internal database 20 will verify when a minimum number of data points (information) are gathered and matched. The minimum "score" is set up in the system and can be adjusted accordingly. Thus, as an example, if both the social security number and home phone number are successfully captured (i.e. 2 out of a possible 4 data points), the process will skip to the activation step 330. If not, the system will proceed to postal zip code validation 37. The caller will be required to enter their postal zip code, which will normally contain at least 5 digits. If no input is received within several seconds, the system will notify the caller that no input has been received and request that their postal zip code be entered. When an invalid number of digits is entered for the postal zip code, the system will notify the caller that they have not entered enough digits or too many digits and request the caller to renter their postal zip code. If an input error occurs, then the system will indicate to the caller that their postal zip code cannot be located and request that the postal zip code be reentered. If another input error occurs, the caller will be placed on hold and the call will be transferred to a customer service representative.

The internal database 20 will again verify whether the minimum number of data points have been captured and matched. If not, the system will proceed to date of birth capture 38. The caller will be asked to enter their date of birth by entering a two digit month, two digit day, and four digit year. If no input is received within several seconds, the system will notify the caller that no input has been received and request that their date of birth be entered. When an invalid number of digits is entered for the date of birth, the system will notify the caller that they have not entered enough digits or too many digits and request the caller to renter their date of birth. If an input error occurs, then the system will indicate to the caller that their date of birth cannot be located and request that the date of birth be reentered. If another input error occurs, the caller will be placed on hold and the call will be transferred to a customer service representative.

Once a minimum number of data points are captured and matched by the system, the process will then proceed to validation. In the validation process customer demographic information is obtained from at least one external/remote database based on the information input by the caller. For example, a person's name, address and other similar information can be obtained from the external database and subsequently stored in the internal database 20. A non-limiting example of the type of information stored in the external/remote database includes information gathered and maintained in a public record database. This process is also referred to as a "reverse append" process 61. A "hot list" can also be checked for any flagged information. Then, based on all the information, the user input information and the other demographic information obtained from databases, an accurate decision can be made whether or not to validate the card.

Next, the system will confirm 70 whether the card is for personal use or if the card is to be given to someone else. Once the caller makes a selection, the system will proceed to activate 330 the card if the card is in an activatable status 80. If the card is in an unactivable status due to mismatch with the database or invalid inventory status 81, the call will be forwarded directly to a customer service representative 100. If the card is in an unactivable status due to a missing or defective reverse append process 61, the call will be forwarded directly to a customer service representative 100. Similarly, when the card is in an unactivable status due to a hot list hit, the call will be forwarded directly to a customer service representative 100. When the card is to be given to another individual, the caller (i.e. purchaser) will be informed that the recipient of the card must call in to activate 72. The caller will then have the option of activating another card 340 or terminating the call 99. The opposite is true if the caller is the recipient and the card is in an unactivable status because the purchaser of the card must call in to activate the card.

Once the card is determined to be in activatable status, the caller will be advised that the card is now active 82. If the card is for personal use 83, the caller will have the option of creating 84 a personal identification number (PIN) in order access cash via ATMs. As an example, the caller will be asked whether they desire to select a PIN. If the caller chooses this option, the caller enters their unique multi-digit PIN number. The system will prompt the caller to reenter their PIN number. The system will then repeat the PIN number and request the caller to confirm its accuracy. Upon confirmation of the PIN by the caller, the system will inform the caller that the PIN is now active.

The caller will have the option to activate 90 another card in the next card process 340. The caller will be prompted to enter the card number 91 and security code 92 in a similar manner as described above. Then the system will confirm 70 whether the card is for personal use or if the card is to be given to someone else and continue forward to activation 330.

FIG. 3 illustrates a flow chart of a portion of a prepaid card activation and data capture process that can be implemented by a recipient of a transaction card who is not the purchaser of the card, on an interactive voice response system. In FIG. 3, like reference numerals refer to the same or similar elements as shown and previously described for FIG. 2 and are not repeated here. As shown in FIG. 3, the person using the card must call the system, which takes the person through similar processes as described for FIG. 3. The common processes are the verification, data capture process, compare process, validation process and activation process.

A shown in FIG. 3, if the purchaser of the card has not yet activated the card, the caller (recipient of the card) is informed that the card is partially activated and that the person who purchased the card must also call the number and complete the activation process 75.

Figure 4:
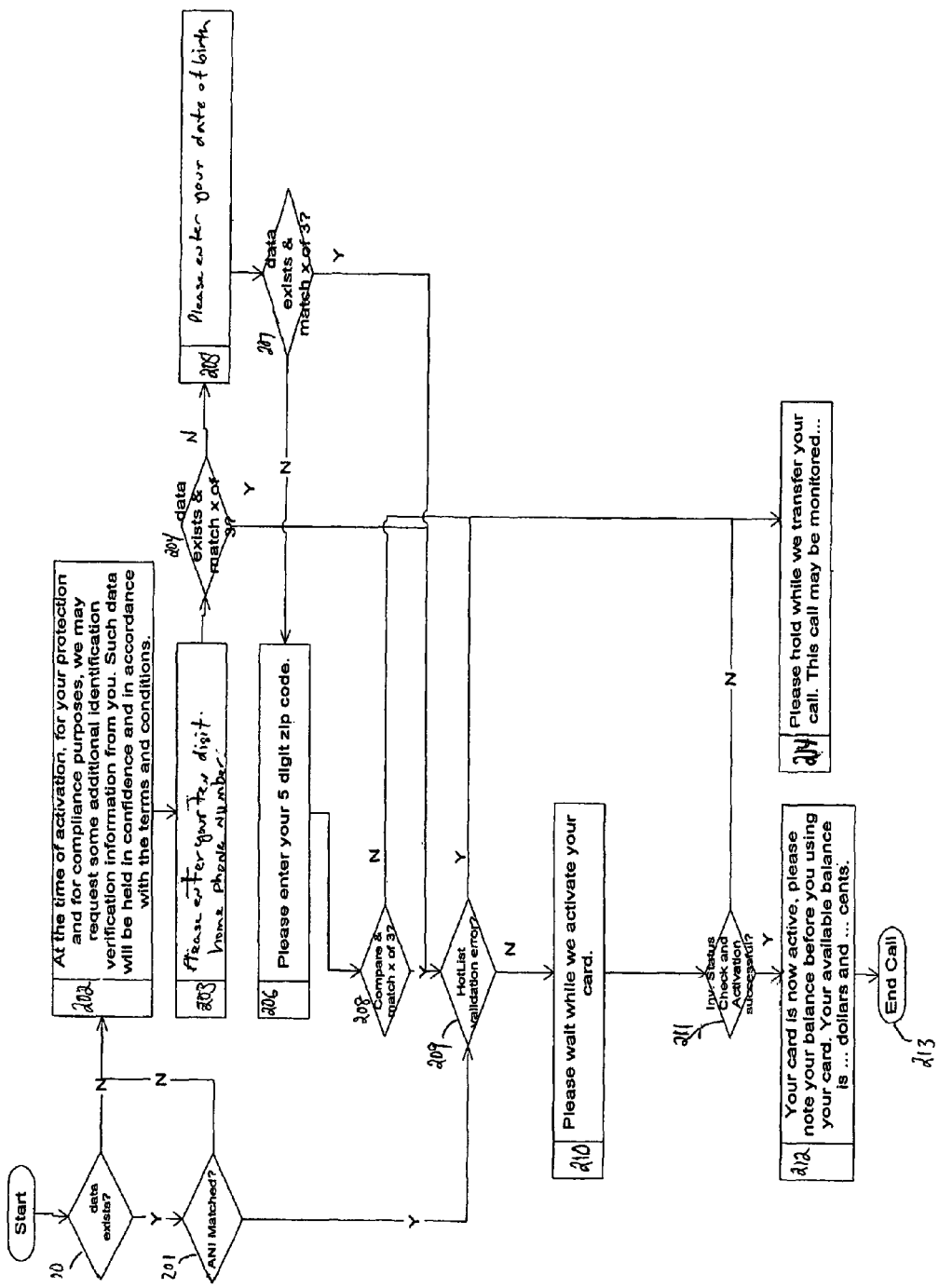
FIG. 4 illustrates a flow chart of a portion of another prepaid card activation and data capture process implemented by an interactive voice response system to activate a non-reloadable, prepaid transaction card.

Another example of an interactive voice response card activation and data capture process is shown in FIG. 4. In this example, the process can be used for a gift card, which is not a reloadable card, and because it is not reloadable, only the card recipient or person using the card needs to call and provide information. The general processes are similar to those described above for the reloadable prepaid transaction card.

If the card number and security code verification steps of FIG. 1 are entered correctly by the caller and the card was not previously activated, the process will proceed with enabling the account, as shown in FIG. 4.

As described in FIG. 4, if the home phone number has been previously captured through an automated sales system and all ready exists 200 in the internal database 20, the IVR system will check 201 ANI. If ANI matches what is in the internal database 20, this section will be skipped and call will proceed to hot list validation 209 and, if appropriate, activation process 210 as there is no need to capture additional information. However, if the home number has not been previously captured, the caller will be informed that they will be requested to enter personal information in order to activate the account 202. If the caller does not desire to enter this information, the call will be transferred and the caller will speak with a customer service representative. Thus, if the caller agrees to provide the information, the process will proceed to data capture.

The caller is prompted 203 to enter their home phone number including area code. If no input is received within several seconds, the system will notify the caller that no input has been received and request that the home phone number be entered. When an invalid number of digits is entered for the home telephone number, the system will notify the caller that they have not entered enough digits or too many digits and request the caller to renter the home phone number. If an input error occurs, then the system will indicate to the caller that the home phone number entered cannot be located and request that the card number be reentered. If another input error occurs, the caller will be placed on hold and the call will be transferred to a customer service representative.

The system will verify 204 when a minimum number of data points are gathered and matched with the internal database 20. The minimum score is setup in the system and can be adjusted accordingly. If the minimum score is not met, the system will proceed 205 to date of birth validation. For example, the caller will be asked to enter their date of birth by entering a two digit month, two digit day, and four digit year. If no input is received within several seconds, the system will notify the caller that no input has been received and request that their date of birth be entered. When an invalid number of digits is entered for the date of birth, the system will notify the caller that they have not entered enough digits or too many digits and request the caller to renter their date of birth. If an input error occurs, then the system will indicate to the caller that their date of birth cannot be located and request that the date of birth be reentered. If multiple input errors occur, the caller will be placed on hold and the call will be transferred to a customer service representative.

The system will again verify 207 when a minimum number of data points are gathered and matched with the internal database 20. If the minimum score is not reached, the caller will be required to enter their postal zip code 206. If no input is received within several seconds, the system will notify the caller that no input has been received and request that their postal zip code be entered. When an invalid number of digits is entered for the postal zip code, the system will notify the caller that they have not entered enough digits or too many digits and request the caller to renter their postal zip code. If an input error occurs, then the system will indicate to the caller that their postal zip code cannot be located and request that the postal zip code be reentered. If multiple input errors occur, the caller will be placed on hold and the call will be transferred to a customer service representative.

If a minimum amount of the information provided by the caller cannot be compared and matched 208, the caller will be placed on hold and the call will be transferred to a customer service representative 214. However, if after entering the postal zip code in step 206, the system can compare and match a minimum amount of information captured by the system, the process will proceed to hot list validation 209. In the validation process the card information is checked against a "hot list" of flagged information that would cause the issuer not to authorize the card, e.g., the caller may be someone who should not be issued a card because of credit problems, fraud or security concerns, etc. If there is no hit during the hot list validation, the process will proceed 210 to activate the card.

If card is in an activatable status the caller will be advised that the card is active and the available balance of the card is provided 212 and the call can be terminated 213. If the card is in an unactivable status due to mismatch with the database or invalid inventory status, the caller will be informed that the card is not available for activation at this time. The caller can try back again or has the option to speak with a customer service representative.

Figure 5:
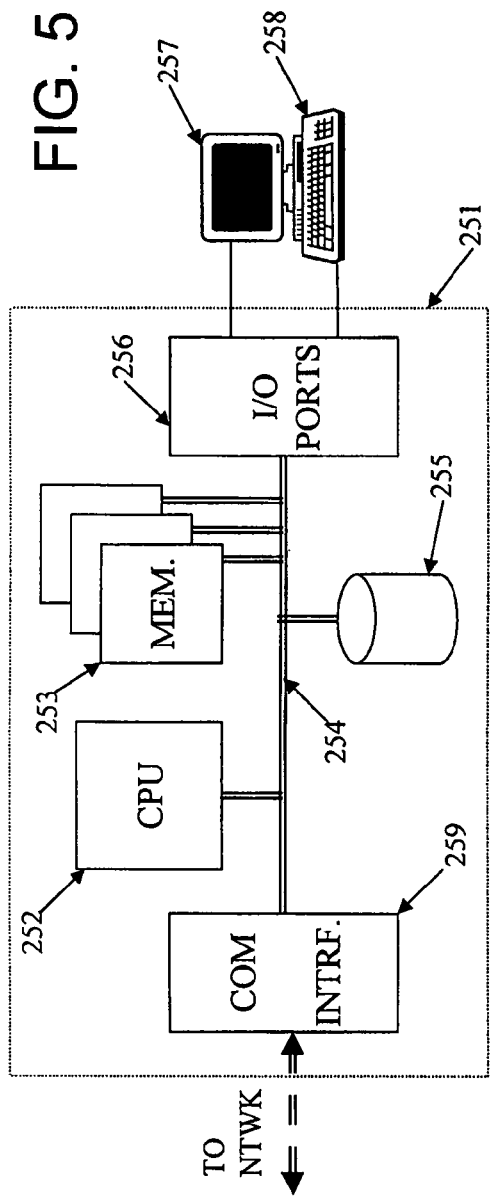
FIGS. 5-6 are simplified block diagrams of a general-purpose computer.

FIG. 5 is a functional block diagram of a PC or workstation type implementation of a system 251, which may serve as an operator interface or other element for the system 10 and/or method 100.

The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 252.

The mass storage may include one or more magnetic disk or tape drives or optical disk drives, for storing data and instructions for use by CPU 252. For example, at least one mass storage system 255, in the form of a disk drive or tape drive, stores the operating system and application software as well as data, including received messages and documents. The mass storage 255 within the computer system 251 may also include one or more drives for various portable media, such as a floppy disk, a compact disc read only memory (CD-ROM), or an integrated circuit non-volatile memory adapter (i.e. PCMCIA adapter) to input and output data and code to and from the computer system 251.

The system 251 also includes one or more input/output interfaces for communications, shown by way of example as an interface 259 for data communications via a network. The interface 259 may be a modem, an Ethernet card or any other appropriate data communications device. The physical communication links may be optical, wired, or wireless (e.g., via satellite or cellular network).

The computer system 251 may further include appropriate input/output ports 256 for interconnection with a display 257 and a keyboard 258 serving as the respective user interface. For example, the computer may include a graphics subsystem to drive the output display 257. The output display 257 may include a cathode ray tube (CRT) display or liquid crystal display (LCD). Although not shown, the PC type system typically would include a port for connection to a printer. The input control devices for such an implementation of the system 251 would include the keyboard 258 for inputting alphanumeric and other key information. The input control devices for the system may further include a cursor control device (not shown), such as a mouse, a trackball, stylus, or cursor direction keys. The links of the peripherals 257, 258 to the system 251 may be wired connections or use wireless communications.

Each computer system 251 runs a variety of applications programs and stores data, enabling one or more interactions via a user interface, provided through elements such as 257 and 258, and/or over a network to implement desired processing.

Figure 6:
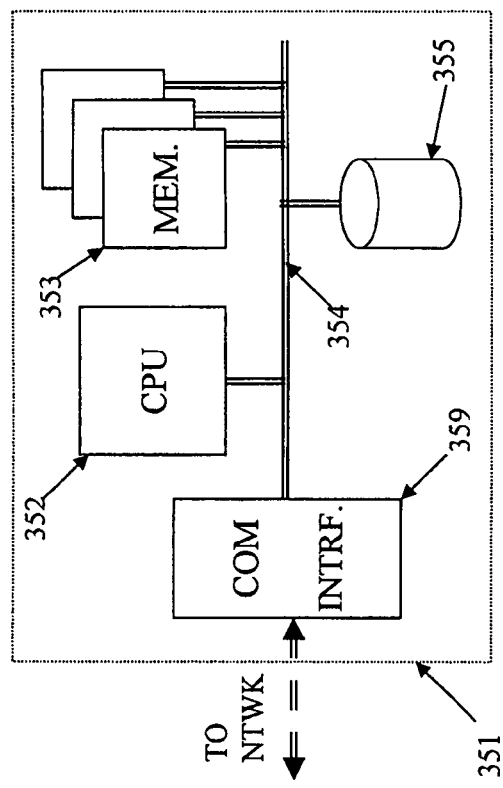

FIG. 6 is a functional block diagram of a general-purpose computer system 351, which may perform the functions of an operator interface or other element of the system and/or process of the present claimed subject matter. The exemplary computer system 351 contains a central processing unit (CPU) 352, memories 353 and an interconnect bus 354. The CPU 352 may contain a single microprocessor, or may contain a plurality of microprocessors for configuring the computer system 352 as a multi-processor system. The memories 353 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 352.

The mass storage may include one or more magnetic disk or tape drives or optical disk drives, for storing data and instructions for use by CPU 352. The mass storage 355 may also include one or more drives for various portable media, such as a floppy disk, a compact disc read only memory (CD-ROM), or an integrated circuit non-volatile memory adapter (i.e. PCMCIA adapter) to input and output data and code to and from the computer system 351.

The system 351 also includes one or more input/output interfaces for communications, shown by way of example as an interface 359 for data communications via a network. The interface 359 may be a modem, an Ethernet card or any other appropriate data communications device. The physical communication links may be optical, wired, or wireless (e.g., via satellite or cellular network). Alternatively, the computer system may comprise a mainframe or other type of host computer system capable of web-based communications via the Internet.

Although not shown, the system 351 may further include appropriate input/output ports for interconnection with a local display and a keyboard or the like serving as a local user interface for programming purposes. Alternatively, operations personnel may interact with the system 351 for control and programming of the system from remote terminal devices via the Internet or some other network link.

The components contained in the computer systems 251 and 351 are those typically found in general purpose computer systems used as servers, workstations, personal computers, network terminals, and the like. In fact, these components are intended to represent a broad category of such computer components that are well known in the art.

At different times all or portions of the executable code or database for any or all of the software elements may reside in physical media or be carried by electromagnetic media. Physical media include the memory of the computer processing systems 251, 351, such as various semiconductor memories, tape drives, disc drives and the like of general-purpose computer systems. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links.

Terms relating to computer or machine "readable medium" as used herein refer to any medium that participates in providing instructions to a processor for execution or for carrying data to or from a processor for storage or manipulation. Such a medium may take many forms, including but not limited to, non-volatile media, volatile media, and transmission media. Non-volatile media include, for example, optical or magnetic disks, such as in any of the storage devices in the system illustrated in FIG. 4. Volatile media include dynamic memory, such as main memory. Transmission media include coaxial cables; copper wire and fiber optics, including the wires that comprise a bus within a computer system. Transmission media can also take the form of electric or electromagnetic signals, or acoustic or light waves such as those generated during radio frequency (RF) and infrared (IR) data communications. Common forms of computer or machine readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, or any other medium from which a computer can read. Various forms of computer or machine-readable media may be involved in carrying one or more sequences of one or more instructions or data to a processor for execution.

In the previous description, numerous specific details are set forth, such as specific materials, structures, processes, etc., in order to provide a better understanding of the present invention. However, the present invention can be practiced without resorting to the details specifically set forth herein. In other instances, well-known techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

The invention claimed is:

1. A non-transitory, tangible computer-readable medium storing computer code that, when executed by a computer-based system for activating a prepaid transaction card, causes the computer-based system to perform operations, comprising:

receiving identity information identifying the prepaid transaction card;

comparing the identity information identifying the prepaid transaction card with corresponding information contained in a first database;

determining that the prepaid transaction card is not activated based on the comparing;

determining if customer information was associated with the prepaid transaction card during a purchase;

in response to no customer information being associated with the prepaid transaction card during the purchase:

capturing customer information to form captured customer information, comparing the captured customer information with corresponding information contained in the first database, and validating the captured customer information when a predetermined minimum number of data points within the captured customer information matches with the corresponding information contained in the first database, by comparing the captured customer information with customer demographic information obtained from a second database;

in response to customer information being associated with the prepaid transaction card during the purchase:

validating the customer information by comparing the customer information with customer demographic information obtained during the purchase from the second database;

comparing the customer information with a stored list of flagged information;

terminating an activation process, if the customer information is on the stored list of flagged information;
determining that the prepaid transaction card is to be used by a card recipient;
capturing the customer information by capturing one or more items of information associated with the card purchaser and the card recipient of the prepaid transaction card; and
activating the prepaid transaction card after the validating, if the customer information is not on the stored list of flagged information.

2. The computer readable medium according to claim 1, wherein the step of capturing customer information occurs through an interactive response system.

3. The computer readable medium according to claim 1, wherein the step of capturing customer information is manually processed by a customer service representative.

4. The computer readable medium according to claim 2, further comprising:
verifying an account number associated with the prepaid transaction card.

5. The computer readable medium according to claim 4, further comprising:
verifying a security code associated with the prepaid transaction card.

6. The computer readable medium according to claim 5, wherein the step of capturing customer information includes capturing one or more items of information selected from a social security number, a home telephone number, a postal zip code, and a date of birth.

7. The computer readable medium according to claim 1, further comprising:
accessing an internal database containing a customer hot list of flagged information.

8. The computer readable medium according to claim 1, wherein the step of activating the prepaid transaction card further comprises a step of creating a personal identification number (PIN).

9. A process of activating a prepaid transaction card, the process comprising:
receiving, by a computer based system for activating a prepaid transaction card, identity information identifying the prepaid transaction card;
comparing, by the computer based system, the identify information identifying the prepaid transaction card with corresponding information contained in a first database;
determining, by the computer based system, that the prepaid transaction card is not activated based on the comparing;
determining, by the computer based system, if customer information was associated with the prepaid transaction card during a purchase;
in response to no customer information being associated with the prepaid transaction card during the purchase:
capturing, by the computer based system, customer information to form captured customer information,
comparing, by the computer based system, the captured customer information with corresponding information contained in the first database, and
validating, by the computer based system, the captured customer information when a predetermined minimum number of data points within the captured customer information matches with the corresponding information contained in the first database, by comparing the captured customer information with customer demographic information obtained from a second database;
in response to customer information being associated with the prepaid transaction card during the purchase:
validating, by the computer based system, the customer information by comparing the customer information with customer demographic information obtained during the purchase from the second database;
comparing, by the computer based system, the customer information with a stored list of flagged information;
terminating, by the computer based system, activation process if the customer information is on stored list of flagged information;
determining that the prepaid transaction card is to be used by a card recipient;
capturing the customer information by capturing one or more items of information associated with the card purchaser and the card recipient of the prepaid transaction card; and
activating, by the computer based system, the prepaid transaction card after the validation process, if the customer information is not on the stored list of flagged information.

10. The process of activating the prepaid transaction card according claim 9, further comprising:
requesting the customer to create a personal identification number (PIN) following the activation step;
receiving the PIN; and
storing the PIN in a database.

11. The process of activating the prepaid transaction card according claim 10, further comprising:
activating an additional prepaid transaction card.

12. The process of activating the prepaid transaction card according claim 11, further comprising:
receiving an opt out communication from the customer causing the customer to be connected to a customer service representative.

13. The process of activating the prepaid transaction card according claim 12, wherein the identity information identifying the prepaid transaction card includes a card number and a security code.

14. A prepaid transaction card activation system comprising:
a prepaid transaction card having identity information;
a processor for administering an incentive program; and
a non-transitory memory storing computer code that, when executed by the processor, causes the processor to:
receive the identity information;
determine that the prepaid transaction card is not activated;
determine if customer information was associated with the prepaid transaction card during a purchase;
in response to no customer information being associated with the prepaid transaction card during the purchase:
capture customer information to form captured customer information,
compare the captured customer information with corresponding information contained in a first database, and
validate the captured customer information when a predetermined minimum number of data points within the captured customer information matches with the corresponding information contained in the first database, by comparing the captured customer information with customer demographic information obtained from a second database;

in response to customer information being associated with the prepaid transaction card during the purchase:

validate the captured customer information by comparing the customer information with customer demographic information obtained from the second database;

compare the customer information with a stored list of flagged information terminate activation process if the customer information is on stored list of flagged information;

determine that the prepaid transaction card is to be used by a card recipient;

capture the customer information by capturing one or more items of information associated with the card purchaser and the card recipient of the prepaid transaction card; and activate the prepaid transaction card after the validation, if the customer information is not on the stored list of flagged information.

\* \* \* \* \*